(12) United States Patent
Bauer et al.

(10) Patent No.: US 7,396,044 B2
(45) Date of Patent: Jul. 8, 2008

(54) DEPLOYMENT CONTROL DEVICE FOR AIR BAG

(75) Inventors: Barney J. Bauer, Rochester, MI (US); Jerome Bosch, Romeo, MI (US); James Karlow, Milford, MI (US); Amy L. Klinkenberger, Highland, MI (US)

(73) Assignee: TK Holdings Inc., Auburn Hills, MI (US)

( * ) Notice: Subject to any disclaimer, the term of this patent is extended or adjusted under 35 U.S.C. 154(b) by 284 days.

(21) Appl. No.: 11/177,354

(22) Filed: Jul. 11, 2005

(65) Prior Publication Data

US 2007/0007757 A1    Jan. 11, 2007

(51) Int. Cl.
*B60R 21/16* (2006.01)

(52) U.S. Cl. ............... 280/743.2; 280/728.1; 280/740; 280/742

(58) Field of Classification Search ............ 280/743.2, 280/743.1, 728.1, 740, 742
See application file for complete search history.

(56) References Cited

U.S. PATENT DOCUMENTS

| | | | |
|---|---|---|---|
| 4,348,037 A * | 9/1982 | Law et al. | ............ 280/733 |
| 5,004,266 A | 4/1991 | Miller et al. | |
| 5,498,023 A | 3/1996 | Adams et al. | |
| 5,630,614 A | 5/1997 | Conlee et al. | |
| 5,727,812 A | 3/1998 | Dykstra et al. | |
| 5,765,867 A | 6/1998 | French | |
| 5,865,466 A * | 2/1999 | Yamamoto et al. | ....... 280/743.1 |
| 6,070,904 A | 6/2000 | Ozaki et al. | |
| 6,371,510 B1 | 4/2002 | Marriott et al. | |
| 6,502,858 B2 | 1/2003 | Amamori | |
| 2001/0035639 A1 | 11/2001 | Amamori | |
| 2003/0189327 A1 | 10/2003 | Burdock et al. | |
| 2003/0189328 A1 | 10/2003 | Cooper et al. | |
| 2004/0155438 A1 | 8/2004 | Hawthorn et al. | |

* cited by examiner

*Primary Examiner*—Eric Culbreth
(74) *Attorney, Agent, or Firm*—Foley & Lardner LLP

(57) ABSTRACT

An airbag assembly includes an airbag and a system provided in contact with at least a portion of the airbag that includes a first member and a second member. The second member at least partially overlaps the first member and is held in contact during initial deployment of the airbag with the first member by a frictional force between the first member and the second member. The system is configured to cause the airbag to inflate laterally with respect to a vehicle occupant until the frictional force is overcome by inflation of the airbag.

5 Claims, 4 Drawing Sheets

DEPLOYMENT CONTROL DEVICE FOR AIR BAG

BACKGROUND

The present invention is related generally to airbags and airbag assemblies. More specifically, the present invention is related to airbag assemblies that include a mechanism for restricting or altering the direction of initial deployment of the airbag.

Inflatable airbags have become standard equipment in modern automobiles. Such airbags typically include a bag portion that inflates when a predetermined condition is met (e.g., an automobile impact). Such airbags may be mounted in a steering wheel, in a portion of a dashboard, or in various other locations within the vehicle.

Conventional airbags used in vehicles are configured to inflate or deploy in the direction of a vehicle occupant. One issue with airbags that deploy in this manner is that in certain situations the impact of the airbag on the vehicle occupants may be greater than is desired. For example, in a front-mount or a mid-mount airbag installation, the deployment door of the airbag module may be directly in front of the chest of a relatively young child. In the event that the child is not properly positioned within the vehicle (e.g., has slid forward on a seat), the impact of the airbag on the chest of the child may be greater than would be desirable.

It would be desirable to provide an improved system for altering the initial direction of inflation of an airbag. It would also be desirable to provide a system for reducing the amount of force transmitted to a vehicle passenger upon inflation of an airbag.

SUMMARY

The present invention relates to an airbag assembly that includes an airbag and a system provided in contact with at least a portion of the airbag that includes a first member and a second member. The second member at least partially overlaps the first member and is held in contact during initial deployment of the airbag with the first member by a frictional force between the first member and the second member. The system is configured to cause the airbag to inflate laterally with respect to a vehicle occupant until the frictional force is overcome by inflation of the airbag.

The present invention also relates to a system for controlling the manner in which an airbag inflates that includes a first strap having a first end coupled to an airbag module and a second end provided in contact with an airbag at a location. The system also includes a second strap having a first end coupled to the airbag module and a second end provided in contact with the second end of the first strap. The first strap and the second strap are frictionally engaged such that inflation of the airbag is initially restrained at the location.

The present invention also relates to an airbag system that includes an airbag configured to inflate in the direction of a vehicle passenger and a system comprising a first fabric member and a second fabric member provided adjacent a portion of the airbag. A portion of the first member is held in contact with a portion of the second member by a frictional force, and the system is configured to alter the initial direction of inflation of the airbag until the frictional force is overcome by inflation of the airbag.

It is to be understood that both the foregoing general description and the following detailed description are exemplary and explanatory only and are not restrictive of the invention as claimed.

BRIEF DESCRIPTION OF THE DRAWINGS

These and other features, aspects, and advantages of the present invention will become apparent from the following description, appended claims and the accompanying exemplary embodiments shown in the drawings, which are briefly described below.

DETAILED DESCRIPTION

According to exemplary embodiment, a system for restraining or altering the initial direction of inflation of an airbag is provided. The system is positioned adjacent or proximate a portion of the folded airbag, and is configured to cause the airbag to inflate laterally or transversely to the direction in which it would normally inflate (e.g., the airbag normally would inflate in the direction of a passenger in a vehicle compartment of an automobile). After initial inflation of the airbag in the lateral or transverse direction for a period of between approximately 3 and 12 milliseconds, the airbag is then allowed to inflate toward the passenger. One advantageous feature of such an arrangement is that the amount of force transmitted to the passenger is reduced, since initial inflation of the airbag proceeds in a direction other than directly at the vehicle occupant.

Figure 1:
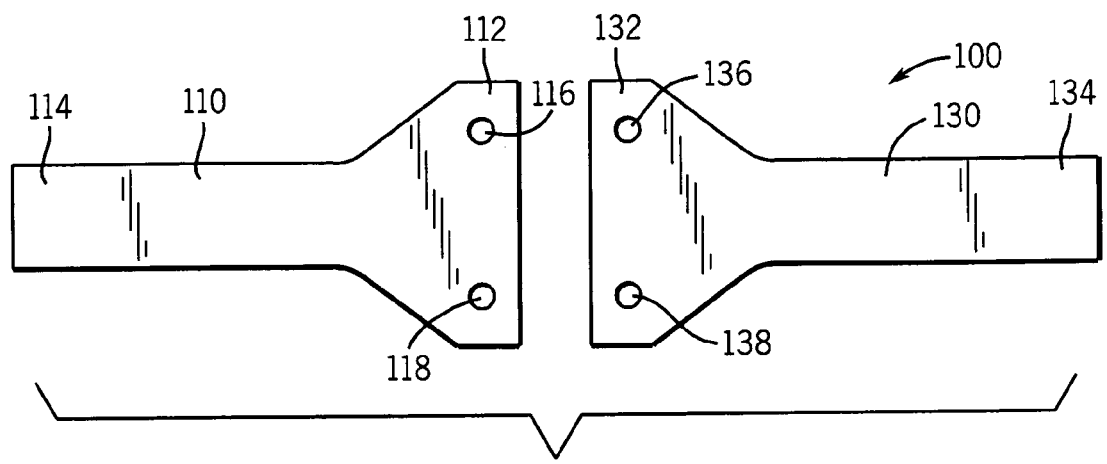
FIG. 1 is a plan view of a system for restraining the deployment direction of an airbag according to an exemplary embodiment.

FIG. 1 illustrates a system 100 that may be provided in an airbag assembly 160 (FIG. 2) for restraining or altering the initial direction of airbag inflation. The system 100 includes a first member or element 110 in the form of a strap or tether and a second member or element 130 in the form of a strap or tether. The size, shape, and configuration of the members 110 and 130 may vary according to various exemplary embodiments (e.g., the width of the end of one member may be greater than the width of the end of the other member.

Figure 2:
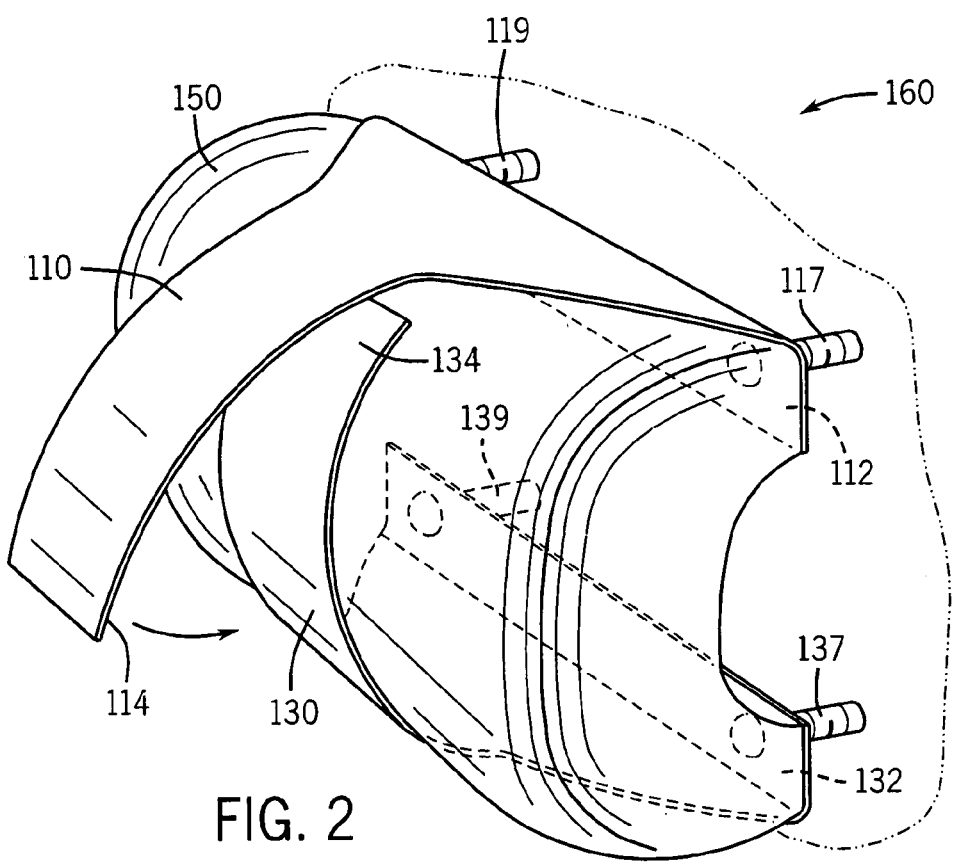
FIG. 2 is a perspective view of a system for restraining the deployment of an airbag being installed in an airbag assembly according to an exemplary embodiment.

Member 110 includes a first end 112 and a second end 114, and the second member 130 includes a first end 132 and a second end 134. The first ends 112, 132 may be secured or coupled to an airbag module (not shown) by fastening the first ends 112, 132 to the airbag module. For this purpose, according to an exemplary embodiment, apertures or holes are provided in the first ends 112, 132 of the members 110, 130. As shown in FIG. 1, member 112 includes apertures 116 and 118 and member 130 includes apertures 136 and 138. As shown in FIG. 2, fasteners (shown as bolts or screws 117, 119, 137, and 139) may be used to fasten the members 110 and 130 to an airbag module.

As shown in FIG. 2, the airbag assembly 160 includes an airbag 150 that prior to deployment is provided in a folded configuration. Various components of the airbag assembly 160 are not shown in FIG. 2, although it will be appreciated by those or ordinary skill in the art that such components are present (e.g., a firing mechanism to inflate or deploy the airbag, etc.).

The member 130 is provided in the airbag assembly 160 such that it is proximate or adjacent to the airbag 150. According to an exemplary embodiment, the member 130 overlays a portion of the center of the airbag 150 such that it is in contact with the center of the airbag.

Figure 3:
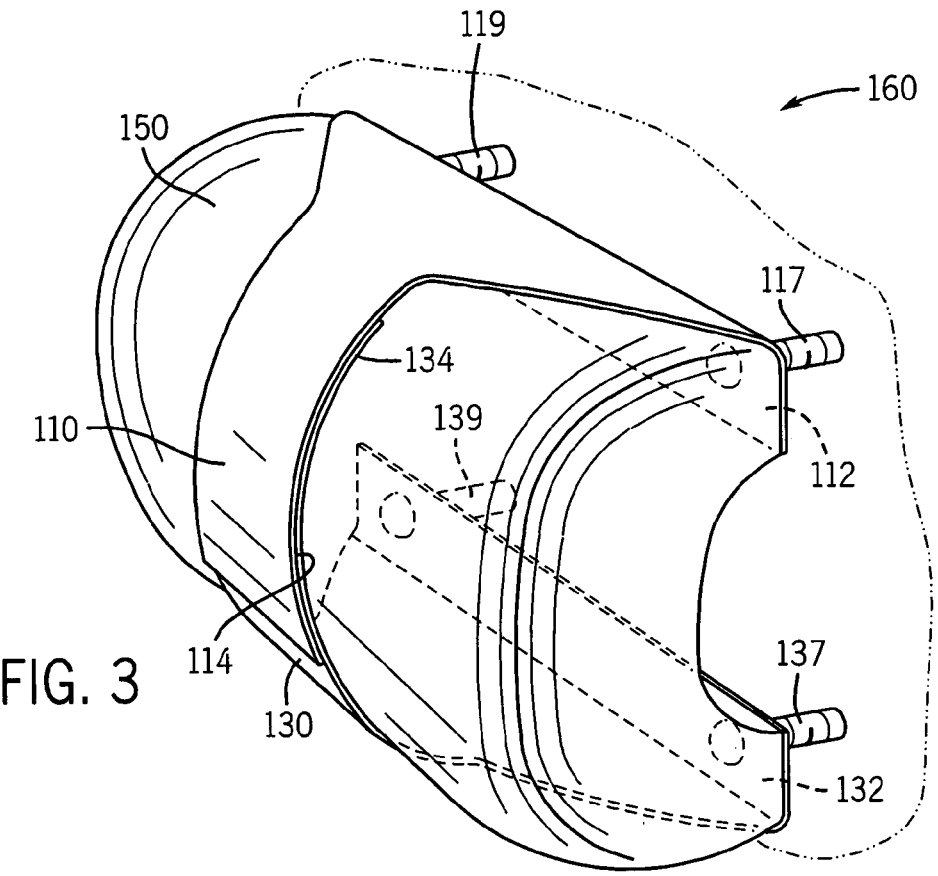
FIG. 3 is a perspective view of the airbag assembly shown in FIG. 2 having the system installed adjacent the airbag according to an exemplary embodiment.

As shown in FIGS. 2 and 3, the member 110 is provided such that a portion of the member 110 overlaps and is in contact with a portion of the member 130. FIG. 2 illustrates the manner in which the member 110 is positioned or folded such that it overlaps the member 130, while FIG. 3 illustrates the fully assembled position in which the member 110 overlaps and is in contact with the member 130. It should be noted that the amount of overlap between the members 110 and 130 may differ according to various exemplary embodiments, and may be selected to provide an adequate amount of friction between the members 110 and 130 (e.g., to produce a frictional force sufficient to maintain the members 110 and 130 in contact with each other for a predetermined period upon initial deployment of the airbag). It should also be noted that while the FIGURES illustrate a configuration in which the member 110 overlaps the member 130, according the another exemplary embodiment, the positions of members 110 and 130 may be reversed.

According to an exemplary embodiment, the member 110 and the member 130 are made of a fabric material such as nylon. According to other exemplary embodiments, the fabric material may be a polyester or other woven or film materials. The material used to form the members 110 and 130 may be identical or may differ according to various exemplary embodiments.

According to an exemplary embodiment, the system 100 may be used to alter or modify the initial direction of deployment of the airbag. In order to accomplish this, the members 110 and 130 are positioned in contact with each other such that there is a frictional force between them that retains them in contact during initial deployment of the airbag, which causes the airbag to deploy laterally or transversely with respect to the direction in which it would otherwise deploy. According to an exemplary embodiment, the coefficient of friction between the first member and the second member is between approximately 0.1 and 0.4. According to other exemplary embodiments, the coefficient of friction between the members is between approximately 0.1 and 1.0.

Figure 4:
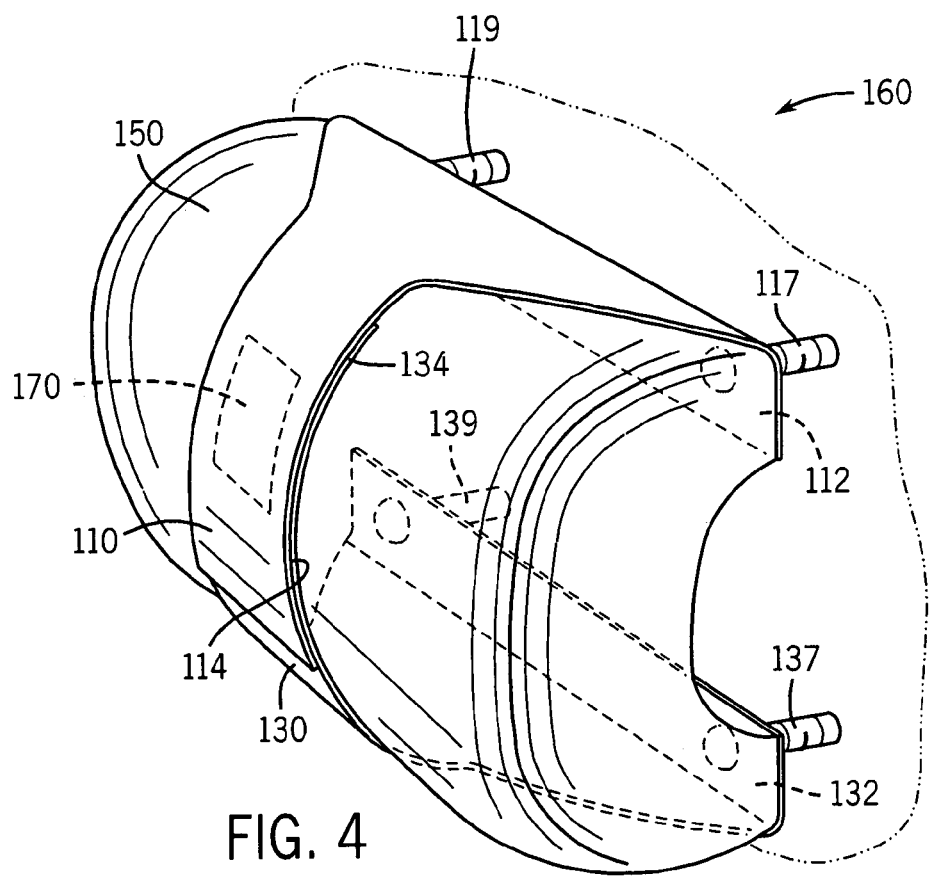
FIG. 4 is a perspective view of a system for restraining the deployment of an airbag installed in an airbag assembly according to another exemplary embodiment.
Figure 8:
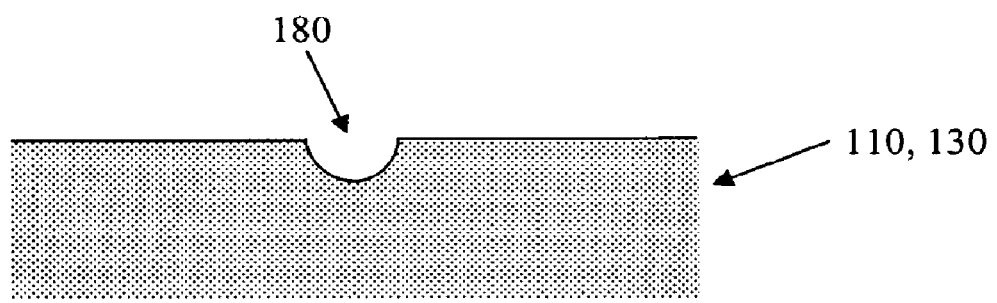
FIG. 8 is a schematic sectional view of a member or element, according to an embodiment.
Figure 9:
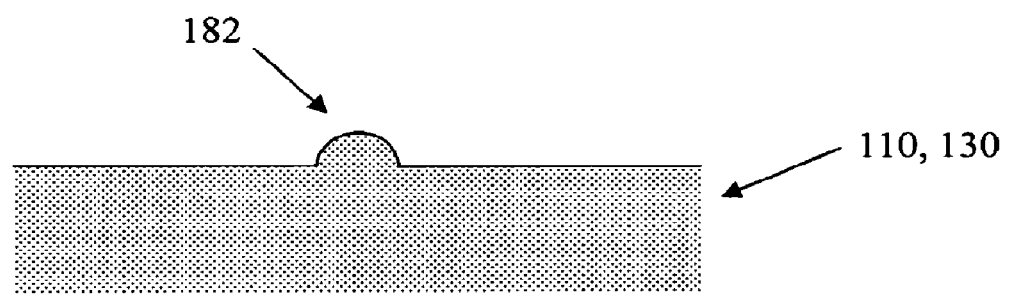
FIG. 9 is a schematic sectional view of a member or element, according to an embodiment.

As shown in FIG. 4, additional means 170 may be employed to increase the coefficient or friction between the members. For example, a hook and loop type fastener (e.g., Velcro™) may be used to enhance the friction between the members. Other means 170 may also be employed. For example, according to another exemplary embodiment, a portion of one or both of the members may have provided thereon a substance that increases the coefficient of friction between the members (e.g., a polymeric material such as a rubber, a relatively rough material such as an abrasive cloth, paper, or film, or any other suitable material). According to still other exemplary embodiments, portions of the members may include features that are intended to provide enhanced friction between the members (e.g., protrusions or extensions such as dimples, ribs, or the like). For example. FIG. 8 is a sectional view of a first member or element 110 or a second member or element 130 that includes at least one dimple 180, and FIG. 9 is a sectional view of a first member or element 110 or a second member or element 130 that includes at least one rib 182, according to an embodiment.

According to an exemplary embodiment, the friction between the members may be due at least in part to the surface roughness of one or both of the members.

Figure 5:
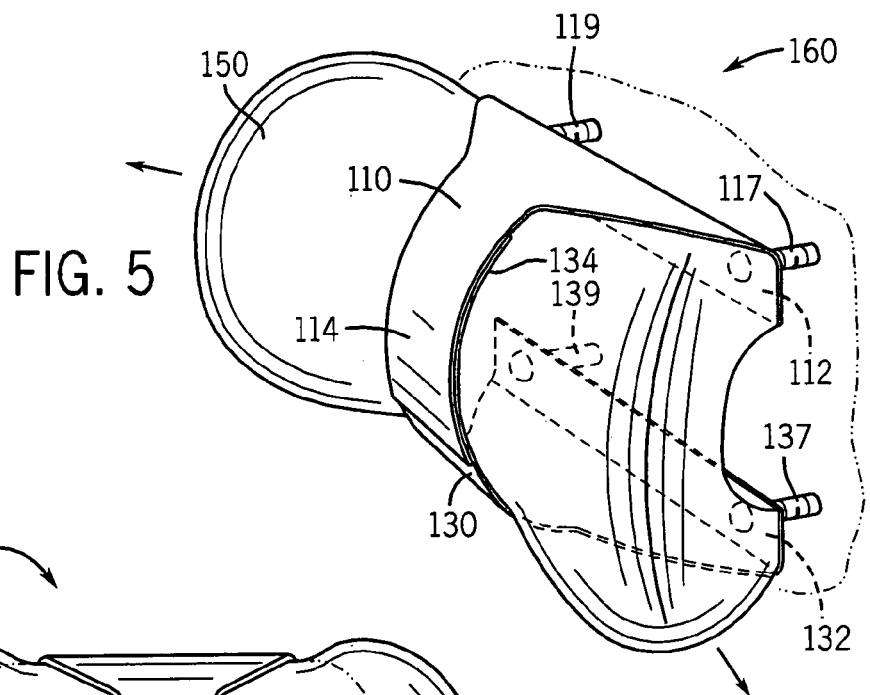
FIG. 5 is a perspective view of the airbag assembly shown in FIG. 3 illustrating the initial deployment of the airbag according to an exemplary embodiment.
Figure 6:
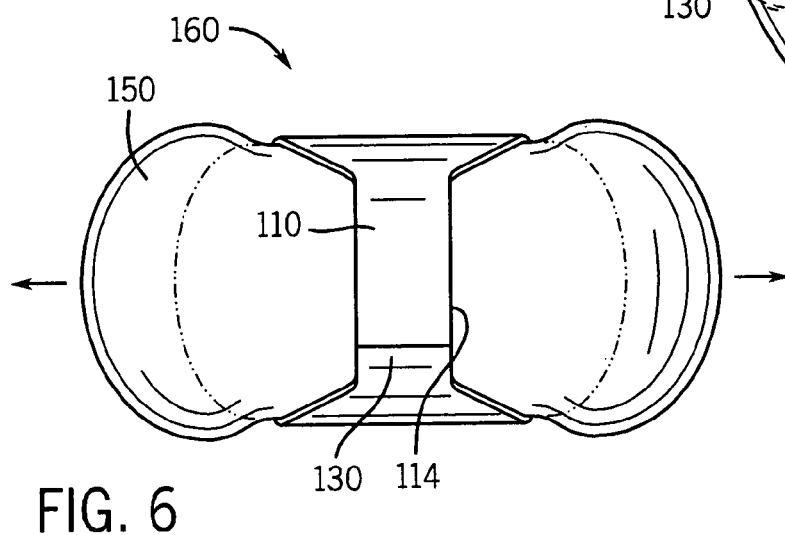
FIG. 6 is a front plan view showing the initial deployment of the airbag shown in FIG. 5.
Figure 7:
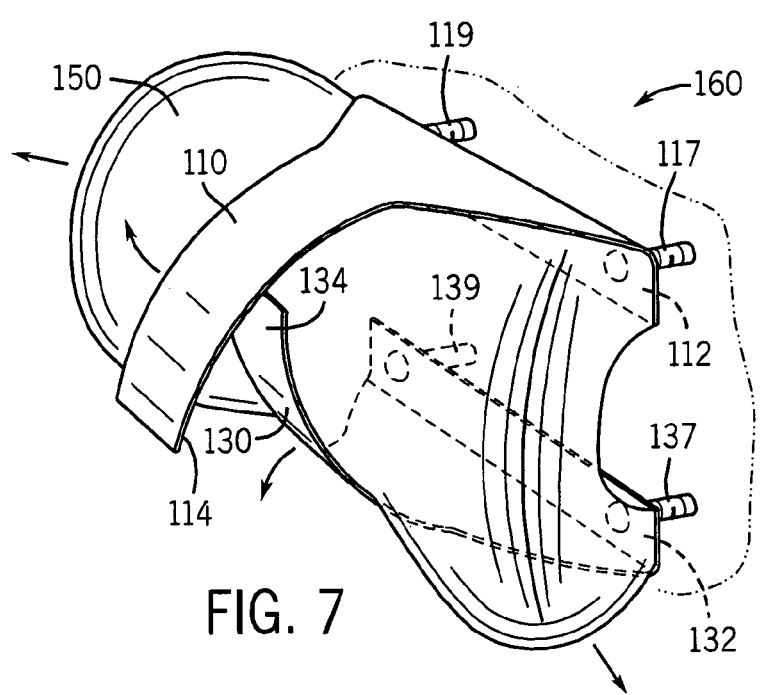
FIG. 7 is a perspective view of the system shown in FIG. 3 illustrating the separation of the members of the system with further deployment of the airbag.

FIGS. 5 to 7 illustrate the deployment of the airbag 150 in the airbag assembly utilizing the system 100. As shown in FIG. 5, the system 100 is provided such that the members 110 and 130 are proximate or adjacent to a portion of the center of the airbag 150. When the airbag initially deploys, the frictional force between the members 110 and 130 acts to restrain or retard outward expansion or inflation of the airbag 150 in the location of the members 110 and 130. FIGS. 5 and 6 illustrate that for the initial period of inflation, the airbag 150 deploys or inflates laterally or transversely to the direction in which it would normally expand (e.g., in the direction of a vehicle occupant). During this initial period, the members 110 and 130 remain in place proximate or adjacent a center portion of the airbag 150.

At a certain point in the inflation of the airbag 150, the force generated by expansion of the airbag will overcome the frictional force between the members 110 and 130. As shown in FIG. 7, at this point, the members 110 and 130 will separate or disengage such that that airbag may expand in a direction toward the vehicle occupant. According to an exemplary embodiment, the members 110 and 130 separate after a period of between approximately 5 and 8 milliseconds after initial deployment of the airbag. According to other exemplary embodiments, the members may separate after a period of between approximately 5 and 20 milliseconds after initial deployment of the airbag.

It is important to note that the construction and arrangement of the airbag assembly as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. Other substitutions, modifications, changes and omissions may be made in the design, operating conditions and arrangement of the preferred and other exemplary embodiments without departing from the scope of the present inventions as expressed in the appended claims.

What is claimed is:

1. An airbag assembly, comprising:
   an airbag; and
   a system provided in contact with at least a portion of the airbag that comprises a first member and a second member, the second member at least partially overlapping and in contact with the first member;
   wherein a frictional force between the first member and the second member is sufficient to hold the first member in contact with the second member during initial deployment of the airbag to cause the airbag to inflate laterally with respect to a vehicle occupant until the frictional force is overcome by inflation of the airbag;

wherein at least one of the first member and the second member include at least one of ribs and dimples provided thereon to enhance the frictional force.

2. The airbag assembly of claim 1, wherein there is a coefficient of friction between the first member and the second member of between approximately 0.1 and 0.4.

3. The airbag assembly of claim 1, wherein the system is configured such that inflation of the airbag will cause the first member and the second member to separate after a period of between approximately 3 and 12 milliseconds after initial deployment of the airbag to allow the airbag to inflate toward the vehicle occupant.

4. The airbag assembly of claim 1, wherein the first member is coupled at a first end to an air bag module and the second member is coupled at a first end to an air bag module.

5. The airbag assembly of claim 1, wherein the first member and the second member comprise a fabric material.

* * * * *